United States Patent
Habuka et al.

(10) Patent No.: US 9,117,271 B2
(45) Date of Patent: Aug. 25, 2015

(54) APPARATUS, METHOD AND RECORDING MEDIUM FOR IMAGE PROCESSING

(71) Applicant: MORPHO, INC., Bunkyo-ku, Tokyo (JP)

(72) Inventors: Kensuke Habuka, Bunkyo-ku (JP); Go Abe, Bunkyo-ku (JP)

(73) Assignee: Morpho, Inc., Tokyo (JP)

(*) Notice: Subject to any disclaimer, the term of this patent is extended or adjusted under 35 U.S.C. 154(b) by 286 days.

(21) Appl. No.: 13/644,309

(22) Filed: Oct. 4, 2012

(65) Prior Publication Data

US 2013/0083171 A1 Apr. 4, 2013

(30) Foreign Application Priority Data

Oct. 4, 2011 (JP) .................................. 2011-220269

(51) Int. Cl.
*H04N 13/02* (2006.01)
*G06T 5/00* (2006.01)
(Continued)

(52) U.S. Cl.
CPC . *G06T 5/003* (2013.01); *G06T 5/50* (2013.01); *H04N 5/23254* (2013.01); *H04N 5/23274* (2013.01); *G06T 2207/10012* (2013.01);
(Continued)

(58) Field of Classification Search
CPC . G06T 5/003; G06T 5/50; G06T 2207/10012; G06T 2207/20021; G06T 2207/20201; H04N 5/23274; H04N 5/23254; H04N 13/00; H04N 13/0022; H04N 13/0242; H04N 13/0207; G02B 23/2415
USPC .......................................................... 348/47
See application file for complete search history.

(56) References Cited

U.S. PATENT DOCUMENTS 6,430,304 B2 * 8/2002 Hanna et al. .................. 382/107
7,128,270 B2 * 10/2006 Silverbrook et al. ..... 235/472.01
(Continued)

FOREIGN PATENT DOCUMENTS

| CN | 101547310 A | 3/2009 |
| CN | 101517568 A | 8/2009 |

(Continued)

OTHER PUBLICATIONS

Office Action issued by Japanese Patent Office in Japanese Application No. 2011-220269 dated Aug. 13, 2013.
(Continued)

*Primary Examiner* — Shan Elahi
(74) *Attorney, Agent, or Firm* — Sughrue Mion, PLLC

(57) ABSTRACT

An image processing apparatus includes: a placement information acquisition section which acquires, for each image sensor, placement information of the image sensors with respect to the imaging section; a movement information acquisition section which acquires movement information of the imaging device; and an output area acquisition section which acquires, for every image sensor, position information of a second output area within the second frame image which corresponds to a first output area within the first frame image. The output area acquisition section acquires: a second output area of a base image sensor based on position information of a first output area determined by the placement information and based on the movement information; and a second output area of another image sensor based on the placement information of the base image sensor, the placement information of the other image sensor, and the movement information.

20 Claims, 14 Drawing Sheets

(51) Int. Cl.
*G06T 5/50* (2006.01)
*H04N 5/232* (2006.01)

(52) U.S. Cl.
CPC .................. *G06T2207/20021* (2013.01); *G06T 2207/20201* (2013.01)

(56) References Cited

U.S. PATENT DOCUMENTS

| | | | | |
|---|---|---|---|---|
| 7,920,299 | B2* | 4/2011 | Abraitis et al. | 358/471 |
| 8,013,909 | B2* | 9/2011 | Nikkanen et al. | 348/229.1 |
| 8,274,552 | B2* | 9/2012 | Dahi et al. | 348/47 |
| 8,280,107 | B2* | 10/2012 | Kmiecik et al. | 382/103 |
| 8,749,660 | B2* | 6/2014 | Yahagi et al. | 348/222.1 |
| 2001/0019621 | A1* | 9/2001 | Hanna et al. | 382/107 |
| 2001/0036307 | A1* | 11/2001 | Hanna et al. | 382/154 |
| 2004/0098224 | A1* | 5/2004 | Takahashi | 702/181 |
| 2004/0190085 | A1* | 9/2004 | Silverbrook et al. | 358/474 |
| 2004/0190092 | A1* | 9/2004 | Silverbrook et al. | 358/539 |
| 2004/0201753 | A1* | 10/2004 | Kondo et al. | 348/239 |
| 2005/0099494 | A1* | 5/2005 | Deng et al. | 348/36 |
| 2005/0254106 | A9* | 11/2005 | Silverbrook et al. | 358/539 |
| 2006/0098893 | A1* | 5/2006 | Kondo et al. | 382/266 |
| 2006/0140497 | A1* | 6/2006 | Kondo et al. | 382/254 |
| 2006/0146198 | A1* | 7/2006 | Kondo et al. | 348/627 |
| 2006/0147128 | A1* | 7/2006 | Kondo et al. | 382/300 |
| 2006/0233460 | A1* | 10/2006 | Kondo et al. | 382/276 |
| 2007/0035706 | A1* | 2/2007 | Margulis | 353/122 |
| 2007/0116377 | A1* | 5/2007 | Kondo et al. | 382/274 |
| 2007/0121138 | A1* | 5/2007 | Kondo et al. | 358/1.9 |
| 2007/0122051 | A1* | 5/2007 | Kondo et al. | 382/266 |
| 2007/0127838 | A1* | 6/2007 | Kondo et al. | 382/274 |
| 2007/0188619 | A1* | 8/2007 | Kurata | 348/208.99 |
| 2008/0012946 | A1* | 1/2008 | Lee et al. | 348/208.4 |
| 2008/0106647 | A1* | 5/2008 | Kimura et al. | 348/607 |
| 2008/0199072 | A1* | 8/2008 | Kondo et al. | 382/155 |
| 2009/0185721 | A1* | 7/2009 | Hiraga et al. | 382/107 |
| 2010/0079624 | A1* | 4/2010 | Miyasako | 348/241 |
| 2010/0329513 | A1* | 12/2010 | Klefenz | 382/104 |
| 2011/0012991 | A1* | 1/2011 | Watanabe et al. | 348/43 |
| 2011/0034176 | A1* | 2/2011 | Lord et al. | 455/450 |
| 2011/0135206 | A1* | 6/2011 | Miura et al. | 382/201 |
| 2011/0234834 | A1* | 9/2011 | Sugimoto | 348/222.1 |
| 2012/0019614 | A1* | 1/2012 | Murray et al. | 348/36 |
| 2012/0113226 | A1* | 5/2012 | Nakata et al. | 348/46 |
| 2013/0113891 | A1* | 5/2013 | Mayhew et al. | 348/47 |

FOREIGN PATENT DOCUMENTS

| | | |
|---|---|---|
| CN | 101686330 A | 3/2010 |
| CN | 201540451 U | 8/2010 |
| CN | 101866106 A | 10/2010 |
| CN | 102006493 A | 4/2011 |
| JP | 08-317424 A | 11/1996 |
| JP | 08-336165 A | 12/1996 |
| JP | 2008-252254 A | 10/2008 |
| JP | 2009-164857 A | 7/2009 |
| JP | 2011-017929 A | 1/2011 |
| TW | 200804965 A | 1/2008 |

OTHER PUBLICATIONS

Chinese Office Action, Application No. 201210368095.3; Feb. 2, 2015.

* cited by examiner

Fig.3
(a)
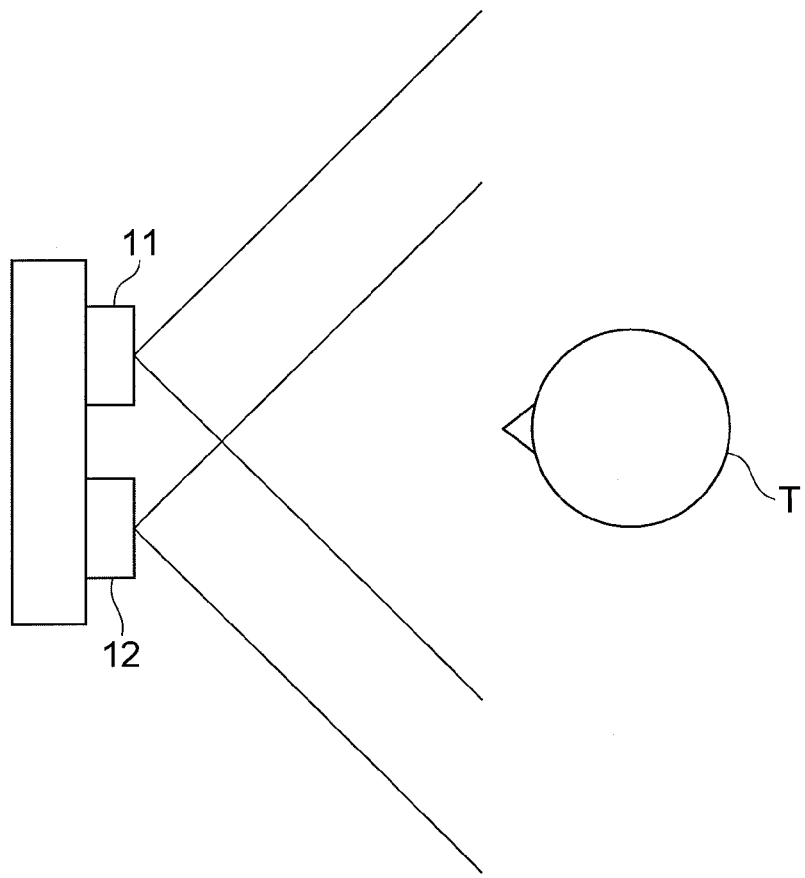
(b)
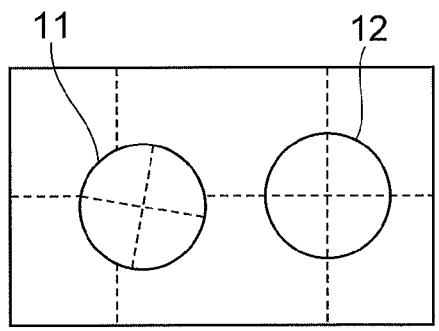

APPARATUS, METHOD AND RECORDING MEDIUM FOR IMAGE PROCESSING

CROSS-REFERENCE TO RELATED APPLICATIONS

The disclosure of Japanese Patent Application No. JP2011-220269 filed on Oct. 4, 2011 including the specification, drawings and abstract is incorporated herein by reference in its entirety.

BACKGROUND OF THE INVENTION

1. Field of the Invention

The present invention relates to an apparatus, a method, a program and a recording medium for image processing.

2. Related Background Art

Conventionally, an apparatus has been known which performs correction processing of moving images based on movement data between generated moving image frames. For example, disclosed below in Patent Document 1 is an apparatus which calculates movement data between a base image and a reference image, calculates a pixel value difference between images in respective matching blocks based on the movement data, determines a superposing ratio between the base image and the reference image in every block based on the pixel value difference, and performs superposing processing to obtain a composite image, and thereby sharper and hand shake-corrected images are provided.

Patent Document 1: Japanese Patent Laid-Open No. 2009-164857

SUMMARY OF THE INVENTION

A technology is known for combining images taken by a plurality of cameras so as to provide a three-dimensional image with a depth. A technology is also known which provides a three-dimensional moving image by generating and displaying such a three-dimensional image in succession. In such a three-dimensional moving image, it is required as in general moving images to perform correction processing such as hand shake correction and distortion correction. When the hand shake correction disclosed in Patent Document 1 is performed on each of the images obtained from a plurality of image sensors, consistency in hand shake correction cannot be maintained among the images obtained from each of the image sensors, which may result in failure of implementing appropriate correction processing.

Accordingly, in this technical field, there is a demand for an apparatus, a method, a program and a recording medium for image processing which can perform correction processing consistent among images obtained from the plurality of image sensors.

An image processing apparatus according to one aspect of the present invention is an image processing apparatus which performs image processing of a plurality of frame images generated by an imaging device having a plurality of image sensors each continuously generating a first frame image and a second frame image in sequence, the apparatus including: a placement information acquisition section which acquires, for each image sensor, placement information indicating placement conditions of the image sensors with respect to the imaging device; a movement information acquisition section which acquires movement information of the imaging device between the first frame image and the second frame image; and an output area acquisition section which acquires, for each image sensor, position information of a second output area within the second frame image, the second output area corresponding to a first output area within the first frame image, wherein the output area acquisition section acquires: as a reference base, the second output area of a base image sensor among the plurality of image sensors based on the position information of the first output area determined by the placement information and based on the movement information; and the second output area of an image sensor being different from the base image sensor, among the plurality of image sensors based on the placement information of the base image sensor, the placement information of another image sensor, and the movement information.

An image processing method according to one aspect of the present invention is an image processing method for performing image processing of a plurality of frame images generated by an imaging device having a plurality of image sensors which continuously generate a first frame image and a second frame image in sequence, comprising: a placement information acquisition step of acquiring, for every image sensor, placement information indicating placement conditions of the image sensors with respect to the imaging device; a movement information acquisition step of acquiring movement information of the imaging device between the first frame image and the second frame image; and an output area acquisition step of acquiring, for every image sensor, position information of a second output area within the second frame image which corresponds to a first output area within the first frame image, wherein in the output area acquisition step, as a reference base, the second output area of a base image sensor among the plurality of image sensors is acquired based on position information of the first output area determined by the placement information and based on the movement information, and the second output area of an image sensor being different from the base image sensor, among the plurality of image sensors is acquired based on placement information of the base image sensor, placement information of the other image sensor, and the movement information.

A computer readable storage medium having stored thereon an image processing program according to one aspect of the present invention is a storage medium having stored thereon an image processing program for operating a computer to perform image processing of a plurality of frame images generated by an imaging device having a plurality of image sensors which continuously generate a first frame image and a second frame image in sequence, the program causing the computer to function as: a placement information acquisition section which acquires, for every image sensor, placement information indicating placement conditions of the image sensors with respect to the imaging device; a movement information acquisition section which acquires movement information of the imaging device between the first frame image and the second frame image; and an output area acquisition section which acquires, for every image sensor, position information of a second output area within the second frame image which corresponds to a first output area within the first frame image, wherein the output area acquisition section acquires: as a reference base, the second output area of a base image sensor among the plurality of image sensors based on position information of the first output area determined by the placement information and based on the movement information; and the second output area of an image sensor being different from the base image sensor, among the plurality of image sensors based on placement information of the base image sensor, placement information of the other image sensor, and the movement information.

According to one aspect of such an invention, the second output area of the base image sensor is acquired based on position information of the first output area determined by the placement information and based on the movement information, and the second output area of an image sensor being different from the base image sensor, among the plurality of image sensors is acquired based on placement information of the base image sensor, placement information of the other image sensor, and the movement information. In this case, the second output area of the base image sensor and the second output area of the other image sensor are acquired based on the movement information which is common between these image sensors. Accordingly, correction processing can be performed with consistency among the images obtained from the plurality of image sensors.

The apparatus may include a determination section which determines for all the image sensors whether or not the position information of the second output area is positioned within the second frame image, wherein when the position information of the second output area is not positioned within the second frame image, the output area acquisition section sets moving amount obtained by a difference between the position information of the first output area and the position information of the second output area to be smaller until the position information of the second output area is positioned within the second frame image in all the image sensors. As a result, it becomes possible to prevent inability of image processing due to the second output area not positioned within the second frame image.

The movement information acquisition section may acquire the movement information from the first frame image and the second frame image generated by the base image sensor. In this case, since the movement information can be obtained from images, the movement information which is common among the plurality of image sensors can be acquired without adding a new hardware configuration.

The movement information acquisition section may acquire the movement information by a gyro sensor. In this case, the movement information common among the plurality of image sensors can be acquired by the gyro sensor, and thereby a processing load can be reduced.

The movement information acquisition section may acquire as the movement information a weighted average of the movement information acquired from the first frame image and the second frame image generated by the plurality of image sensors. In this case, the movement information is acquired based on the plurality of image sensors, and thereby the movement information can be acquired with sufficient accuracy.

Moreover, the base image sensor may be selected from the plurality of image sensors based on image pickup conditions. In this case, by selecting, for example, an image sensor having sufficient performance as the base image sensor, the movement information can be acquired with sufficient accuracy.

The output area acquisition section may use an area other than an output area being needed because of using the plurality of image sensors, as an area for use in correction with movement. In this case, a margin for obtaining a three-dimensional image can also be used for correction with movement, and thereby a plurality of correction processes can be performed with one margin. Accordingly, it becomes possible to reduce decrease in the number of valid pixels after correction processing, which is caused by the necessity of securing the margin.

According to one aspect of the present invention, it becomes possible to perform correction processing consistent among images obtained from the plurality of image sensors.

BRIEF DESCRIPTION OF THE DRAWINGS

FIG. 3 is a view explaining placement information of a first image sensor and a second image sensor;

DESCRIPTION OF THE PREFERRED EMBODIMENTS

Figure 1:
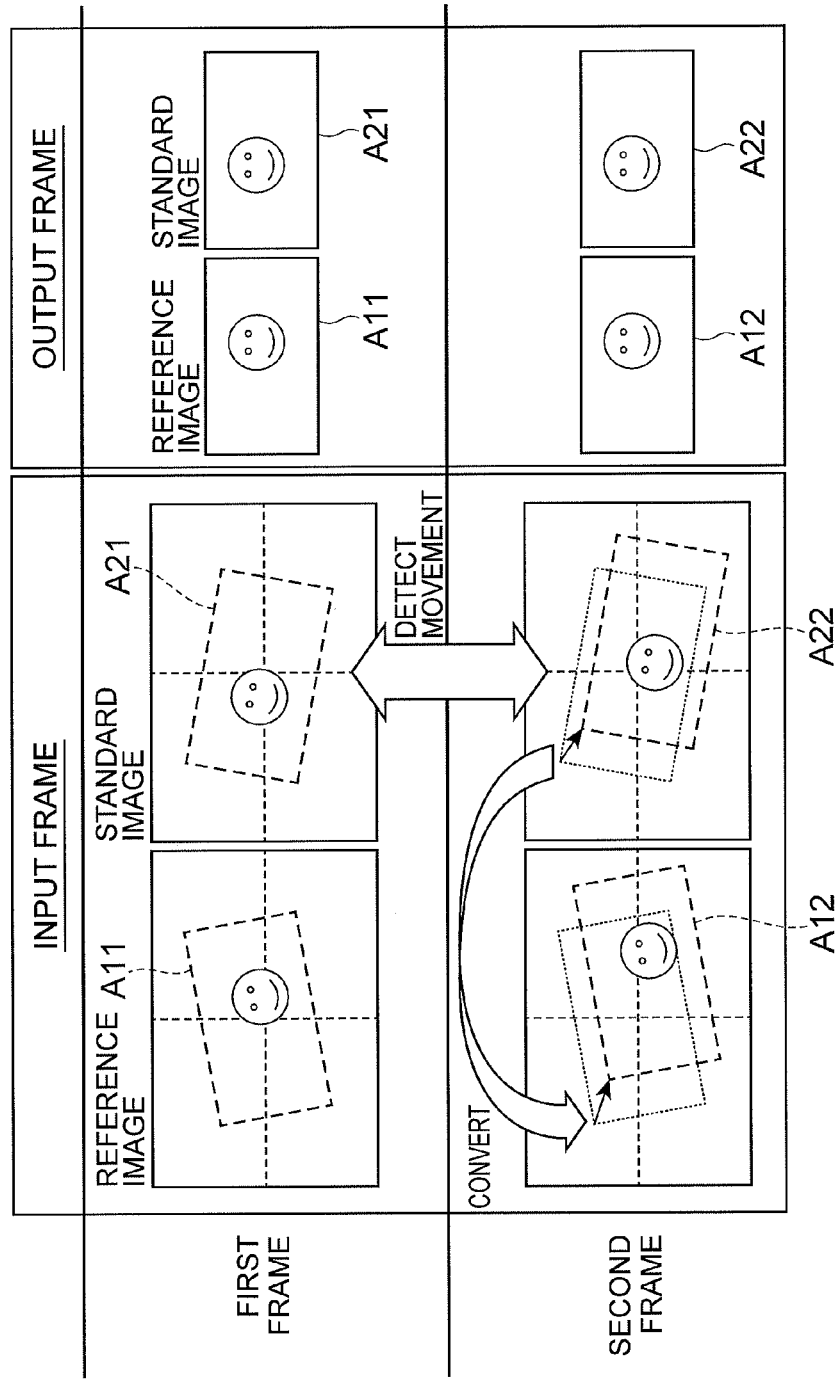
FIG. 1 is a view explaining the outline of hand shake correction by the plurality of image sensors.

Hereinafter, embodiments of the present invention will be described with reference to the accompanying drawings. In descriptions of the drawings, the same reference numerals are given to the same or corresponding components and duplicated explanation will be omitted.

First Embodiment

An image processing apparatus of a first embodiment is an apparatus which performs hand shake correction processing being consistent among images inputted from the plurality of image sensors. The image processing apparatus is mounted on mobile phones, digital cameras, video cameras, or general computer systems. In one example, the apparatus is used for multiple cameras. In the present embodiment, a description is given of a configuration including two image sensors as an example of the plurality of image sensors.

First of all, a description will be given of a method for acquiring a three-dimensional image from two image sensors for easy understanding of one aspect of the present invention. FIG. 1 shows input frames generated by two image sensors, a first image sensor and a second image sensor, and output frames obtained by clipping a part of a pixel area of the input frames. Hereinafter, the areas clipped from a first frame and a second frame and generated by the first image sensor (first output areas) are respectively referred to as a first output area A11 and a second output area A12. The areas clipped from a first frame and a second frame and generated by the second image sensor (second output areas) are also respectively referred to as a first output area A21 and a second output area A22. In order to obtain a three-dimensional image with use of the first image sensor and the second image sensor, a specified image area which includes an object T is clipped as the first output area A11 from the first frame image generated by the first image sensor, and the first output area A21 corresponding to the first output area A11 is clipped from the first frame image generated by the second image sensor 12. A three-dimensional image is obtained from disparity information between the first output area A11 and the first output area A21. In this case, the position of the first output area A21 corresponding to the first output area A11 is uniquely determined by placement information, such as a placement position and a placement angle of the second image sensor with respect to the first image sensor. The position of the first output area A11 corresponding to the first output area A21 is uniquely determined by placement information, such as a placement position and a placement angle of the first image sensor with respect to the second image sensor. The placement information will be described later in detail.

The image processing apparatus according to the present embodiment detects movement information of an imaging section 10 between the first frame image and the second frame image. Corresponding to moving amount of the imaging section, the image processing apparatus moves the position of the second output area A12 of the first image sensor and the position of the second output area A22 of the second image sensor, and acquires position information of the moved second output areas A12 and A22. In this case, if hand shake correction is independently performed on each of the image sensors, it is difficult to associate the second output area A12 with the second output area A22, which may result in failure of acquiring appropriate disparity information. Accordingly, in the image processing apparatus according to the present embodiment, moving amount of the output area obtained based on the movement information of one image sensor is reflected upon the output area of the other image sensor so as to implement consistent hand shake correction regardless of the placement information. Hereinafter, the image processing apparatus according to the present embodiment will be explained.

Figure 2:
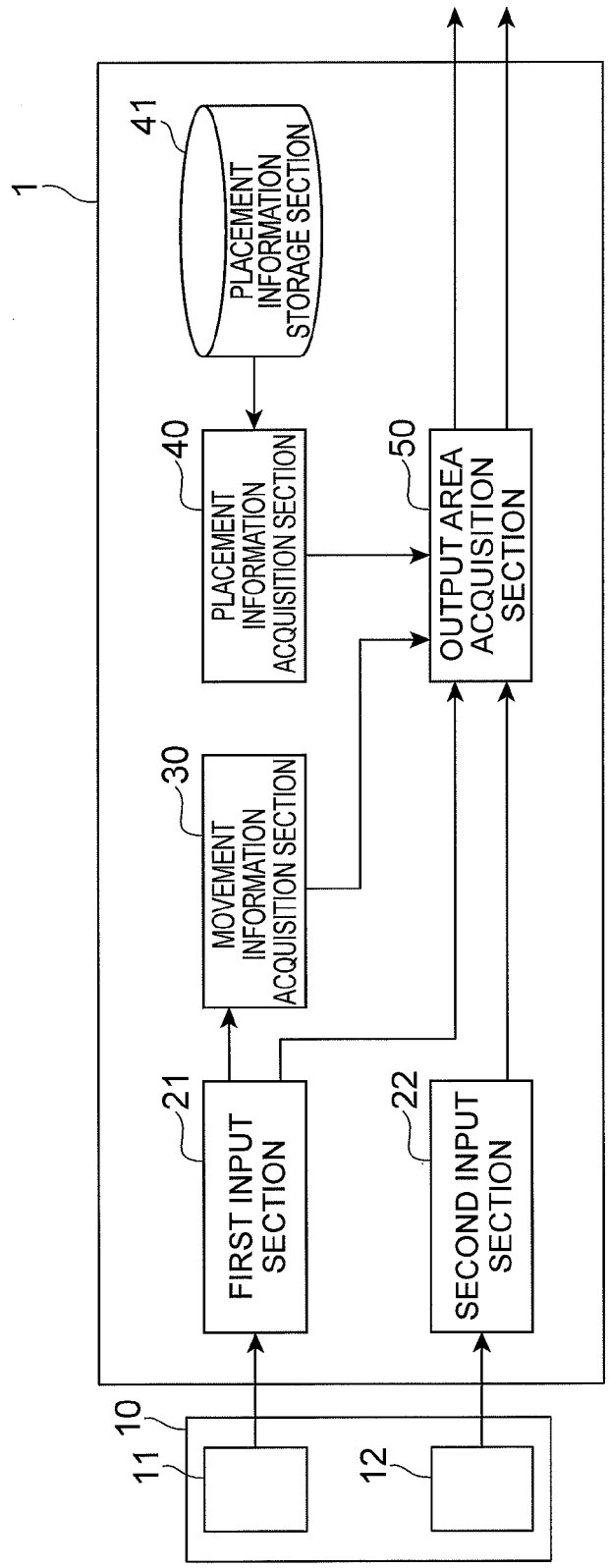
FIG. 2 is a block diagram showing a functional configuration of an image processing apparatus in a first embodiment.

FIG. 2 is a block diagram showing a functional configuration of an image processing apparatus 1 in the present embodiment. The image processing apparatus 1 is an apparatus which performs image processing of images generated by the imaging section 10 having the plurality of image sensors. The imaging section 10 of the present embodiment includes two image sensors.

The imaging section 10 includes a first image sensor 11 and a second image sensor 12. The first image sensor 11 and the second image sensor 12 are means for generating an image of a subject. For example, the imaging section 10 comprises image sensors such as C-MOSs (Complementary Metal Oxide Semiconductors) and CCDs (Charged Coupled Devices) as its principal parts. The first image sensor 11 and the second image sensor 12 continuously generate a first frame image and a second frame image in sequence. The first image sensor 11 and the second image sensor 12 are placed at a specified interval and at a specified angle with each other as shown in FIGS. 3(*a*) and 3(*b*). The imaging section 10 placed in this way generates an identical image pickup object T as shown in FIG. 3(*a*).

The imaging section 10 is composed of a base image sensor which serves as a reference base, among the plurality of image sensors and a reference image sensor which is an image sensor different from the base image sensor. The image generated by the base image sensor is used at the time of generating movement information for use in performing correction processing of an image. In the present embodiment, the first image sensor 11 is used as a base image sensor while the second image sensor 12 is used as a reference image sensor. The first image sensor 11 and the second image sensor 12 output generated first frame image and second frame image as image data to the image processing apparatus 1.

Figure 4:
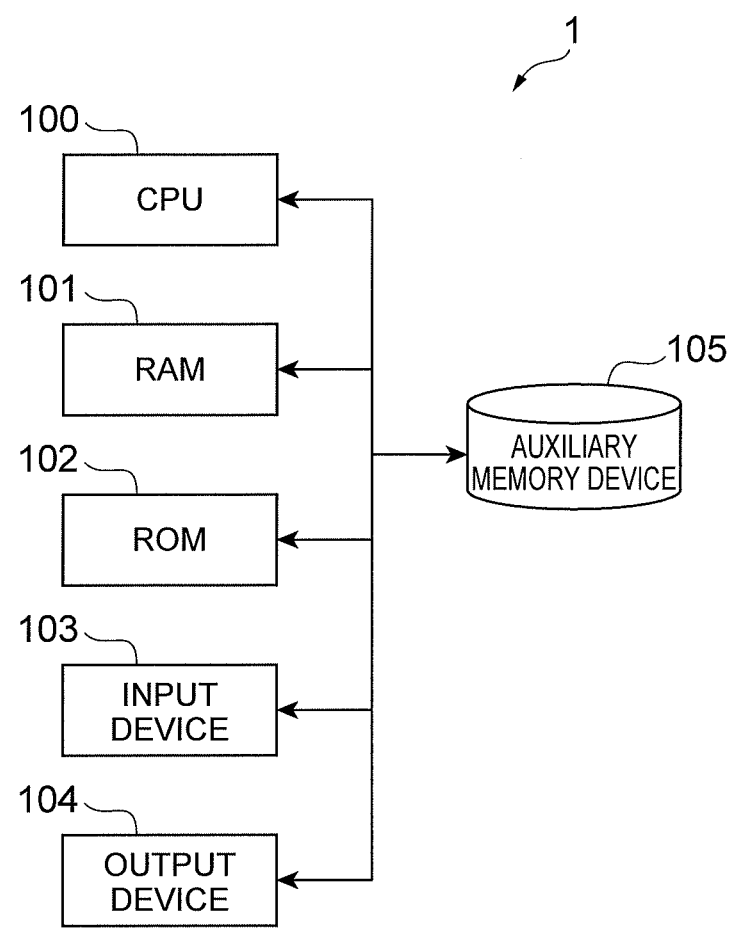
FIG. 4 is a view showing a hardware configuration of the image processing apparatus.

FIG. 4 is a view showing a hardware configuration of the image processing apparatus 1. As shown in FIG. 4, the image processing apparatus 1 is physically configured as a general computer system including a CPU (Central Processing Unit) 100, a main memory device such as a ROM (Read Only Memory) 101 and a RAM (Random Access Memory) 102, an input device 103 such as a keyboard, an output device 104 such as a display, and an auxiliary memory device 105 such as a hard disk. Later-described functions of the image processing apparatus 1 are each implemented by causing the computer to read specified computer software into the hardware such as the CPU 100, the ROM 101 and the RAM 102 and thereby the input device 103 and the output device 104 are operated under control of the CPU 100 while causing the computer to read and write data from and onto the main memory device or the auxiliary memory device 105. The image processing apparatus 1 may include a communication module and the like.

Functionally, the image processing apparatus 1 includes a first input section 21, a second input section 22, a movement information acquisition section 30, a placement information acquisition section 40, a placement information storage section 41, and an output area acquisition section 50 as shown in FIG. 2.

The first input section 21 represents a function of acquiring image data (hereinafter also referred to as a base image) generated by the first image sensor 11 that is a base image sensor. The first input section 21 outputs a first frame image and a second frame image generated by the first image sensor to the movement information acquisition section 30 and to the output area acquisition section 50.

The second input section 22 represents a function of acquiring image data (hereinafter also referred to as a reference image) generated by the second image sensor 12 that is a reference image sensor. The second input section 22 acquires each of a first frame image and a second frame image generated by the second image sensor 12. The second input section 22 outputs the first frame image and the second frame image generated by the second image sensor to the output area acquisition section 50.

Figure 5:
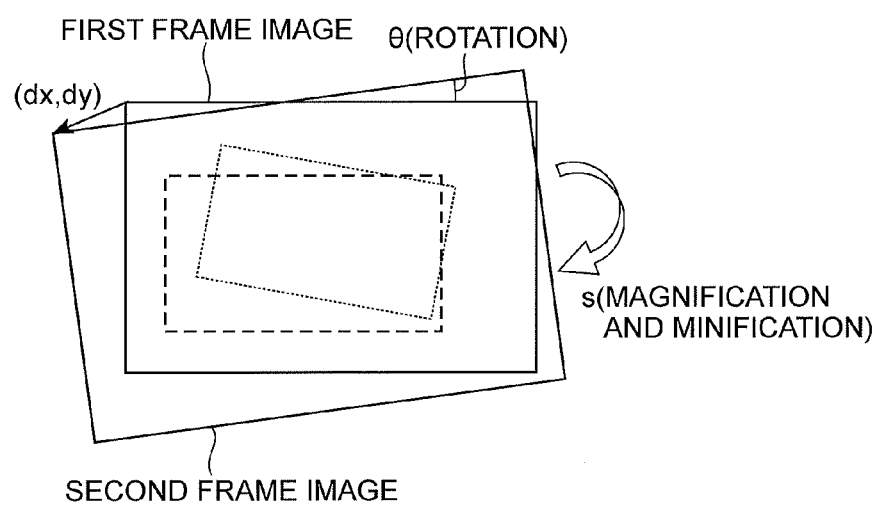
FIG. 5 is a view explaining movement information.

The movement information acquisition section 30 represents a function of acquiring movement information of the imaging section 10 between the first frame image and the second frame image. The movement information is a value calculated based on spatial displacement amount between the first frame image, used as reference, and the second frame image. In detail, the first frame image and the second frame image are divided into blocks of a specified size, and image signal patterns in respective blocks are searched to find the patterns which are most closely matched between the frames. Spatial displacement amount (motion vector) between the most closely matched image signal patterns between the frames is calculated as movement information. More specifically, as shown in FIG. 5, the movement information acquisition section 30 acquires rotation amount θ of the second frame image with respect to the first frame image, shift amount of an image origin dx, dy, and magnified amount s as the movement information. The movement information acquisition section 30 outputs the acquired movement information to the output area acquisition section 50.

The placement information acquisition section 40 acquires placement information indicating placement conditions of the first image sensor 11 and the second image sensor 12 with respect to the imaging section 10. The placement information refers to parameters representing a placement position, a placement angle and the like of the image sensors with respect to the imaging section 10. These parameters are set at the time of designing the imaging section 10. When the imaging section 10 and the image processing apparatus 1 are connected, the placement information stored in the imaging section 10 is acquired and stored in the placement information storage section 41. The placement information acquisition section 40 acquires the placement information of the first image sensor 11 and the second image sensor 12 from the placement information storage section 41. The placement information acquisition section 40 outputs the acquired placement information of the first image sensor 11 and the second image sensor 12 to the output area acquisition section 50. Alternatively, the placement information acquisition section 40 may acquire the placement information directly from the imaging section 10.

The output area acquisition section 50 acquires position information of the second output areas A12 and A22 within the second frame image, which correspond to first output areas A11 and A21 within the first frame image. The second output areas A12 and A22 corresponding to the first output areas A11 and A21 herein refer to the second output areas A12 and A22 which are the matches for the first output areas A11 and A21. The output area acquisition section 50 sets the positions of the second output areas A12 and A22 of the second frame image so that the second output areas A12 and A22 are not displaced from the first output areas A11 and A21 within the first frame image. The set positions of the second output areas A12 and A22 may be identical to the positions of the first output areas A11 and A21 or may be different from the positions of the first output areas A11 and A21. The output area acquisition section 50 acquires the second output area for each image sensor. Hereinafter, a description will be given of calculation processing for acquiring the position information of the second output area A12 of the first image sensor 11 and the second output area A22 of the second image sensor 12.

Figure 6:
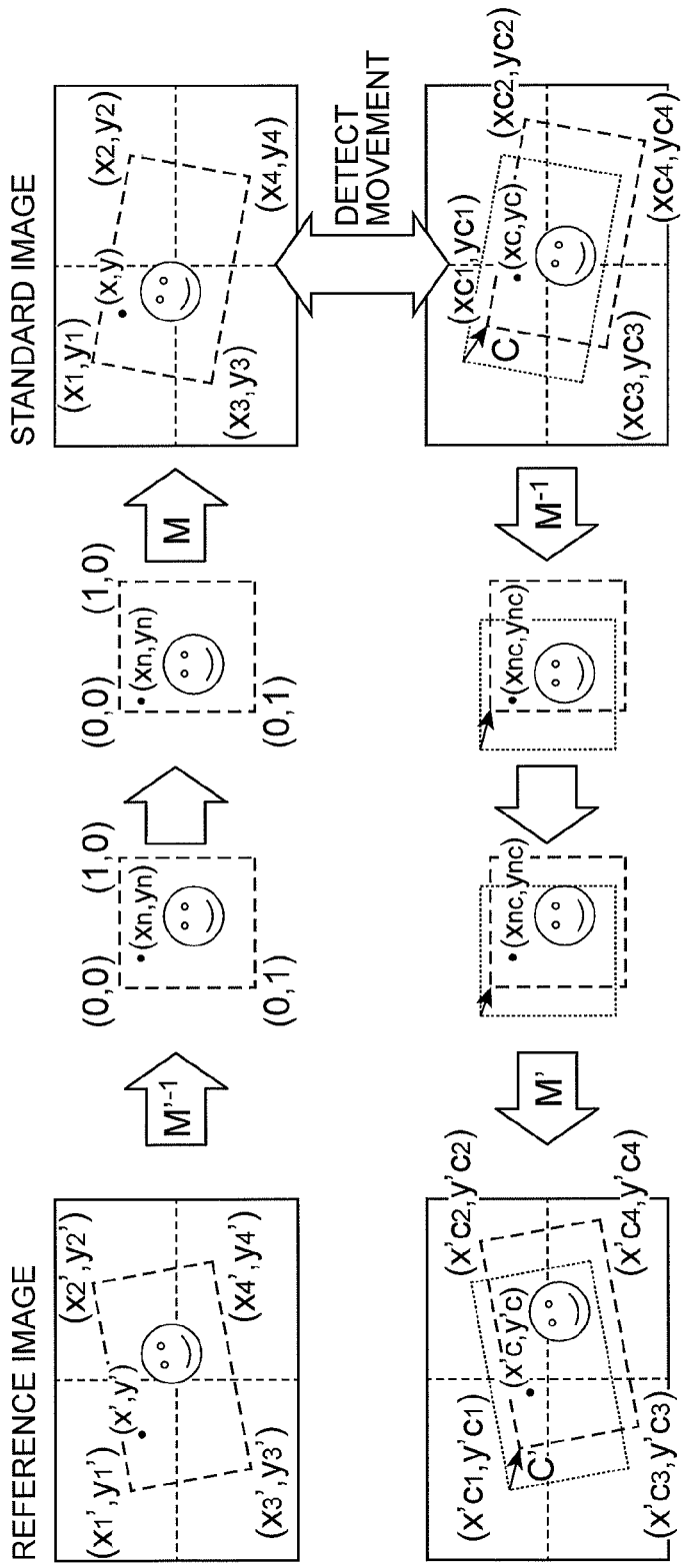
FIG. 6 is a view showing procedures for calculation processing in an output area acquisition section.

FIG. 6 shows procedures in calculation processing for acquiring the position information of the second output area A12 of the first image sensor 11 and the second output area A22 of the second image sensor 12. The calculation processing of the output area acquisition section 50 will be described along with FIG. 6.

First, the output area acquisition section 50 converts an arbitrary coordinate (x', y') within the first frame image of the reference image into a coordinate (xn, yn) of a normal coordinate system by Formula (1). A normalized matrix is a matrix for converting the coordinate system of an inputted image to a normal coordinate system. A normalized-matrix $M'^{-1}$ in Formula (1) is an inverse matrix of a denormalized matrix M' of the second image sensor 12 shown in Formula (2). The denormalized matrix M' is a matrix for converting the normal coordinate system to the coordinate system of the reference image. The denormalized matrix M' is obtained from clipping positions $(x_1', y_1')$, $(x_2', y_2')$, and $(x_3', y_3')$ of the first output area A21 of the first frame image by the second image sensor 12. The denormalized matrix M' is determined by position information of the second image sensor 12 with respect to the imaging section 10 outputted from the placement information acquisition section 40.

$$(xn, yn, 1) = M'^{-1}(x', y', 1) \qquad (1)$$

$$M' = \begin{pmatrix} x_2' - x_1' & x_3' - x_1' & x_1' \\ y_2' - y_1' & y_3' - y_1' & y_1' \\ 0 & 0 & 1 \end{pmatrix} \qquad (2)$$

Next, the output area acquisition section 50 converts the coordinate (xn, yn) of the normal coordinate system into a coordinate (x, y) in a coordinate system of the first image sensor 11 by Formula (3). A denormalized matrix M in Formula (3) is a matrix for converting the normal matrix into a coordinate system of the base image. The denormalized matrix M is shown in Formula (4). The denormalized matrix M is obtained from clipping positions $(x_1, y_1)$, $(x_2, y_2)$, and $(x_3, y_3)$ of the first output area A11 of the first frame image by the first image sensor 11. The denormalized matrix M is determined by position information of the first image sensor 11 with respect to the imaging section 10 outputted from the placement information acquisition section 40.

$$(x, y, 1) = M(xn, yn, 1) \qquad (3)$$

$$M = \begin{pmatrix} x_2 - x_1 & x_3 - x_1 & x_1 \\ y_2 - y_1 & y_3 - y_1 & y_1 \\ 0 & 0 & 1 \end{pmatrix} \qquad (4)$$

Next, the output area acquisition section 50 calculates a movement correction matrix C shown in Formula (5) based on the movement information acquired from the movement information acquisition section 30.

$$C = \begin{pmatrix} s\cos\theta & -s\sin\theta & dx \\ s\sin\theta & s\cos\theta & dy \\ 0 & 0 & 1 \end{pmatrix} \qquad (5)$$

Next, as shown in Formula (6), the output area acquisition section 50 multiplies the coordinate (x, y) in the coordinate system of the first image sensor 11 by the movement correction matrix C to obtain a corrected coordinate (xc, yc) of the first image sensor 11. Moving amount and a moving direction from the coordinate (x, y) to the coordinate (xc, yc) are equivalent to moving amount and a moving direction of the second output area A12 with respect to the first output area A11. Thus, the output area acquisition section 50 acquires position information of the second output area A12 corresponding to the first output area A11.

$$(xc, yc, 1) = C(x, y, 1) \qquad (6)$$

Next, the output area acquisition section 50 converts the corrected coordinate (xc, yc) in the coordinate system of the first image sensor 11 into a coordinate (xnc, ync) of the normal coordinate system by Formula (7). Then, the coordinate (xn, yn) in the normal coordinate system is converted into a corrected coordinate (x'c, y'c) in a coordinate system of the second image sensor 12 by Formula (8). Moving amount and a moving direction from the coordinate (x', y') to the coordinate (x'c, y'c) are equivalent to moving amount and a moving direction of the second output area A22 with respect to the first output area A21. Thus, the output area acquisition section 50 acquires position information of the second output area A22 corresponding to the first output area A21.

$$(xnc, ync, 1) = M^{-1}(xc, yc, 1) \qquad (7)$$

$$(x'c, y'c, 1) = M'(xnc, ync, 1) \qquad (8)$$

The above-described calculation processing performed by the output area acquisition section 50 can be summarized as shown below. That is, an arbitrary coordinate (x', y') within the first frame image of the reference image is converted into a corrected coordinate (x'c, y'c) according to Formula (9). When C' is equal to $M'M^{-1}CMM'^{-1}$ in Formula (9), C' becomes a movement correction matrix of the second image sensor 12 that is a reference image sensor.

$$(x'c, y'c, 1) = M'M^{-1}CMM'^{-1}(x', y', 1) \quad (9)$$

Next, a description will be given of the operation of the image processing apparatus 1 and a method for image processing according to the present embodiment with reference to FIG. 7.

First, the placement information acquisition section 40 acquires placement information of the first image sensor 11 and the second image sensor 12 from the placement information storage section 41 (S11). Next, the movement information acquisition section 30 acquires movement information from a first frame image and a second frame image of the base image from the first input section 21 (S12). Next, the output area acquisition section 50 converts an arbitrary coordinate (x', y') in the reference image into a normal coordinate (xn, yn) by Formula (1) (S13). Then, the output area acquisition section 50 converts the normal coordinate (xn, yn) into a coordinate (x, y) within the base image by Formula (3) (S14). In this case, a denormalized matrix M for use in conversion to the coordinate (x, y) of the base image is a value determined by the placement information of the first image sensor 11 with respect to the imaging section 10.

Next, the output area acquisition section 50 converts, as shown in Formula (6), the coordinate (x, y) into a coordinate (xc, yc) with the movement correction matrix C determined by the movement information, which was acquired by the movement information acquisition section 30 (S15). Next, the output area acquisition section 50 acquires position information of the second output area A12 from moving amount of the coordinate (xc, yc) with respect to the coordinate (x, y) (S16). Next, the output area acquisition section 50 converts the coordinate (xc, yc) into a normal coordinate (xcn, ycn) by Formula (7) (S17). Then, the output area acquisition section 50 converts the normal coordinate (xcn, ycn) into a coordinate (x'c, y'c) within the reference image by Formula (8) (S18). Next, the output area acquisition section 50 acquires position information of the second output area A22 from moving amount of the coordinate (x'c, y'c) with respect to the coordinate (x', y') (S19). Once the position information of the second output area A12 is acquired, the image processing apparatus ends the image processing of FIG. 7.

Next, a description will be given of image processing program for causing a computer to function as the image processing apparatus 1.

The image processing program includes a main module, an input module, a movement information acquisition module, a placement information acquisition module, a placement information storage module, and an output area acquisition module. The main module is a portion which performs comprehensive control on image processing. The input module operates the computer so that inputted images are acquired from the first image sensor 11 and the second image sensor 12. Functions implemented by executing the movement information acquisition module, the placement information acquisition module, the placement information storage module, and the output area acquisition module are each similar to the functions of the movement information acquisition section 30, the placement information acquisition section 40, the placement information storage section 41, and the output area acquisition section 50.

The image processing program is provided in the form of, for example, a storage medium such as ROMs or a semiconductor memory. The image processing program may also be provided via a network as data signals.

As described above, according to the present embodiment, the second output area A12 of the first image sensor 11 that is a base image sensor is acquired based on the position information of the first output area A11 determined by the placement information and based on the movement information, and the second output area A22 of the second image sensor 12, which is an image sensor different from the base image sensor, among the plurality of image sensors is acquired based on the placement information of the first image sensor 11, the placement information of the second image sensor 12, and the movement information. Since the second output area A12 of the first image sensor 11 and the second output area A22 of the second image sensor 12 are acquired based on the movement information which is common between the first image sensor 11 and the second image sensor 12, it becomes possible to perform correction processing consistent between the images obtained from the first image sensor 11 and the second image sensor 12. Moreover, since a margin for use in obtaining a three-dimensional image is used as a margin for use in hand shake correction, it becomes possible to provide an output image which was hand shake corrected without narrowing an output area.

Second Embodiment

Next, a description will be given of an image processing apparatus according to a second embodiment. The image processing apparatus is different from that of the first embodiment in the following point. That is, when the position information of the second output areas A12 and A22 is not positioned within the second frame image, moving amount, which is obtained by a difference between the position information of the first output areas A11, A21 and the position information of the second output areas A12, A22, is adjusted to be small until the position information of the second output area is positioned within the second frame image in all the image sensors.

Figure 8:
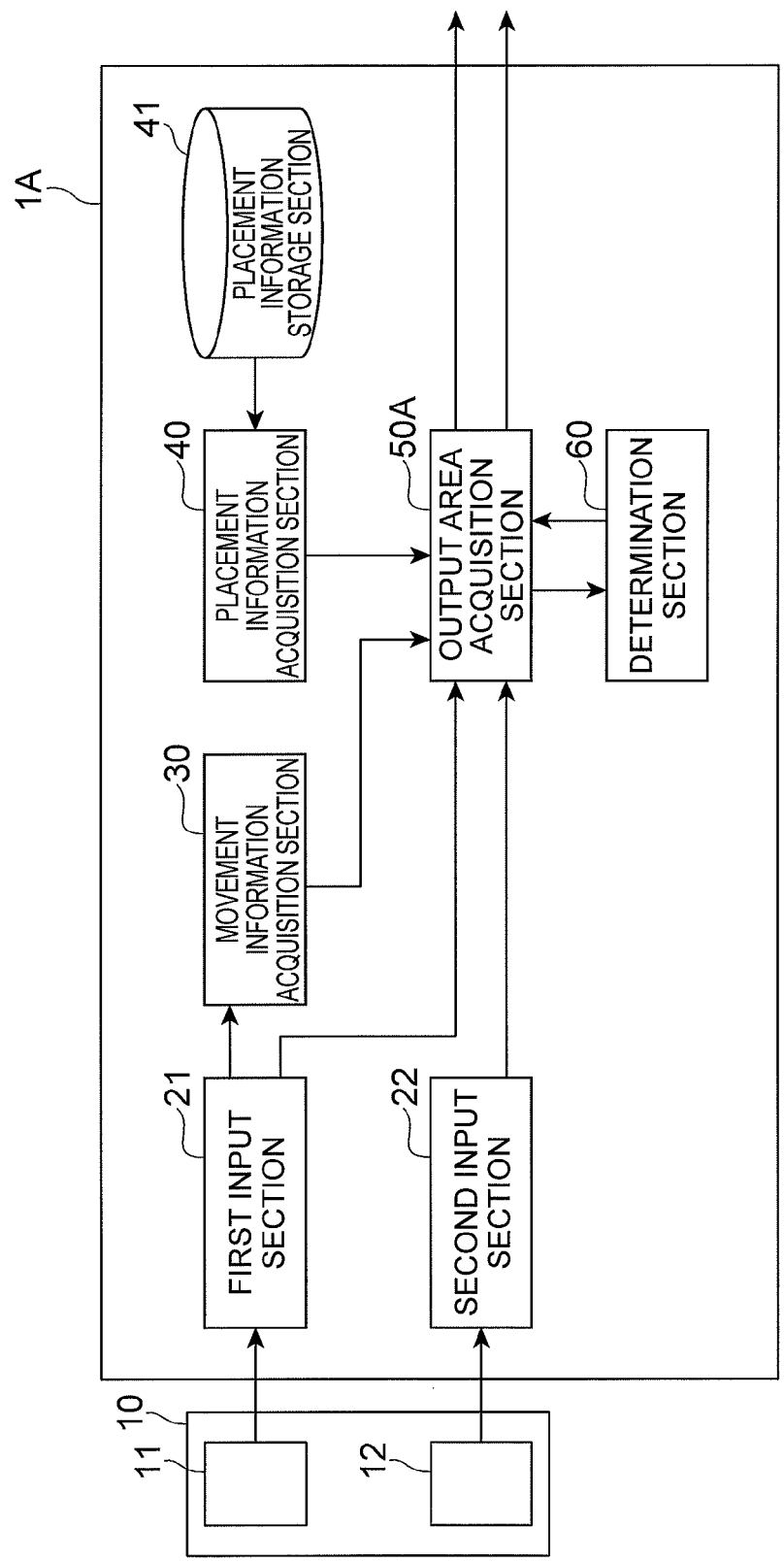
FIG. 8 is a block diagram showing a functional configuration of an image processing apparatus in a second embodiment.

FIG. 8 is a block diagram showing a functional configuration of an image processing apparatus 1A according to the present embodiment. The image processing apparatus 1A according to the present embodiment includes an output area acquisition section 50A in place of the output area acquisition section 50. Moreover, the determination section 60 is provided in addition to the image processing apparatus 1 according to the first embodiment. Other structural components are the same as those of the first embodiment.

The determination section 60 has the function to determine whether or not the second output areas A12 and A22 in the second frames of the first and second imaging devices are positioned respectively within the second frame images. The determination section 60 determines whether or not the coordinates of four apexes (xc1, yc1), (xc2, yc2), (xc3, yc3), and (xc4, yc4) of the second output area A12 calculated by Formula (6) are within the second frame image of the first image sensor 11. The determination section 60 also determines whether or not the coordinates of four apexes (x'c1, y'c1), (x'c2, y'c2), (x'c3, y'c3) and (x'c4, y'c4) of the second output area A22 calculated by Formula (9) are within the second frame image generated by the second image sensor 12. When it is determined that the coordinate of at least one of four apexes is not within the second frame image in either one of the second output area A12 or the second output area A22, the determination section 60 outputs a deviation signal, indicating that the second output areas A12 and A22 are out of the second frame image, to the output area acquisition section 50A.

Upon reception of the deviation signal from the determination section 60, the output area acquisition section 50A sets moving amount, which is obtained by a difference between the position information of the first output areas A11, A21 and the position information of the second output areas A12, A22, to be smaller until the position information of the second output areas A12, A22 is positioned within the second frame image in all the image sensors. A description will be hereinbelow given of recalculation for adjusting the position information of the second output areas A12 and A22 with reference to FIG. 9.

Figure 9:
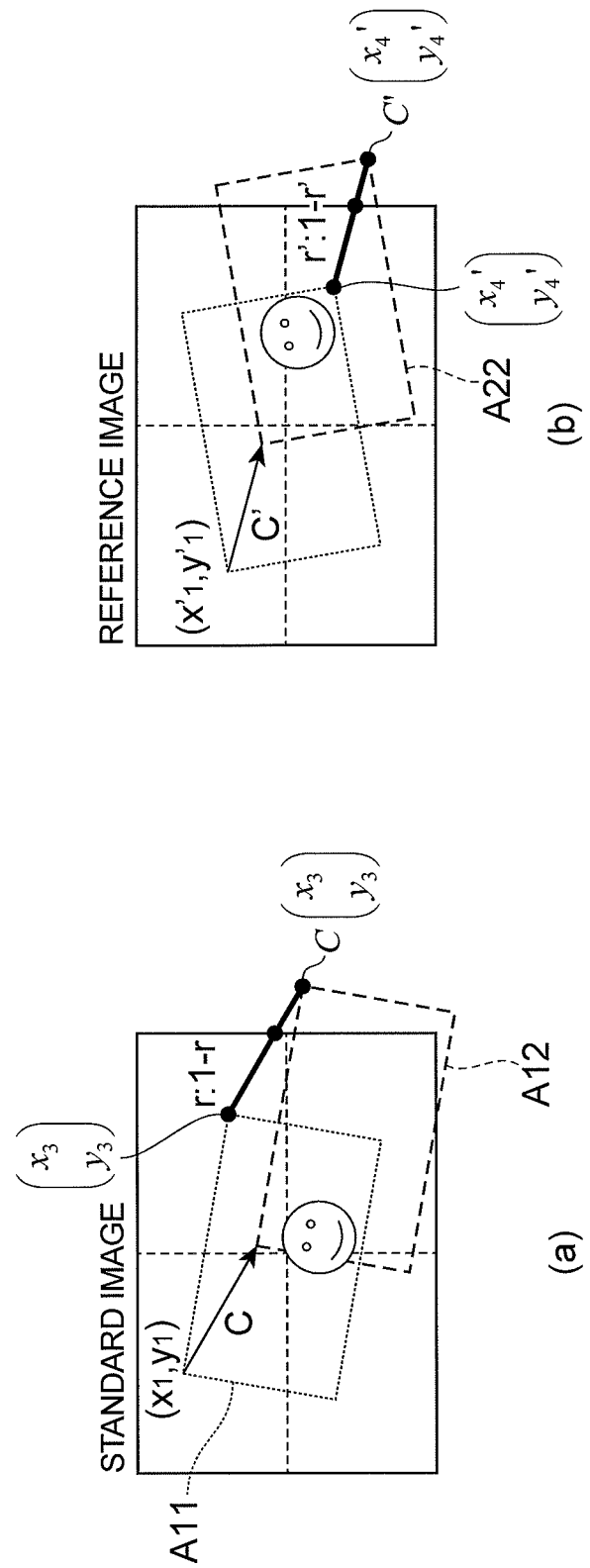
FIG. 9 is a view explaining a method for recalculating a movement correction matrix.

FIG. 9(*a*) shows an example in which the second output area A12 is positioned out of the second frame of the first image sensor 11. In this example, a coordinate C (x3, y3) and a coordinate C (x4, y4) of the second output area A12 are positioned out of the second frame. In this case, the output area acquisition section 50A calculates a frame inside/outside ratio r. Hereinafter, a frame inside/outside ratio r of the coordinate C (x3, y3) is calculated. However, a frame inside/outside ratio r of the coordinate C (x4, y4) may be calculated instead.

When a coordinate of the first output area is connected by a straight line to a coordinate which corresponds to the coordinate of the first output area and which positions out of the second frame, the frame inside/outside ratio r is defined as a ratio between a length of a portion of the straight line inside the second frame and a length of a portion of the straight line outside the second frame. The output area acquisition section 50A calculates the frame inside/outside ratio r, and then updates the correction matrix C by Formula (10). In Formula (10), I represents a unit matrix. The output area acquisition section 50A then multiplies a coordinate (x, y) in a coordinate system of the base image by the updated movement correction matrix C so as to acquire position information of the second output area A12. The output area acquisition section 50A also acquires position information of the second output area A22 based on the position information of the updated second output area A12 by Formulas (7) and (8).

$$C = C \cdot r + I \cdot (1-r) \tag{10}$$

Then, the determination section 60 again determines whether or not four apexes of the second output area A12 determined by the updated correction matrix C are within the second frame image of the first image sensor 11, and updates the correction matrix by Formula (10) until all the apexes are positioned within the second frame image. The determination section 60 also acquires the second output area A12 and the second output area A22 based on the updated correction matrix. When it is determined in the determination section 60 that the coordinates of all the apexes are within the second frame image, the second output area A12 and the second output area A22 at that point of time are outputted.

FIG. 9(*b*) shows an example in which the second output area A22 is positioned out of the second frame of the second image sensor 12. In this example, a coordinate C' (x'3, y'3) and a coordinate C' (x'4, y'4) of the second output areas A12 are positioned out of the second frame. In this case, the output area acquisition section 50A calculates the frame inside/outside ratio r'. Hereinafter, a frame inside/outside ratio r of the coordinate C' (x'4, y'4) is calculated. However, a frame inside/outside ratio r of the coordinate C' (x'3, y'3) may be calculated instead.

The output area acquisition section 50A calculates the frame inside/outside ratio r', and then updates the correction matrix C by Formula (11). The output area acquisition section 50A then multiplies a coordinate (x, y) in the coordinate system of the first image sensor 11 by the updated movement correction matrix C so as to acquire the position information of the second output area A12. The output area acquisition section 50A also acquires the position information of the second output area A22 based on the position information of the updated second output area A12 by Formulas (7) and (8).

$$C = C \cdot r' + I \cdot (1-r') \tag{11}$$

Then, the determination section 60 again determines whether or not four apexes of the second output area A12 determined by the updated correction matrix C are within the second frame image of the first image sensor 11, and updates the correction matrix by Formula (11) until all the apexes are positioned within the second frame image. The determination section 60 also acquires the second output area A12 and the second output area A22 based on the updated correction matrix. When it is determined in the determination section 60 that the coordinates of all the apexes are within the second frame image, the second output area A12 and the second output area A22 at that point of time are outputted.

Next, a description will be given of the operation of the image processing apparatus 1A and a method for image processing according to the present embodiment with reference to FIG. 10.

Figure 7:
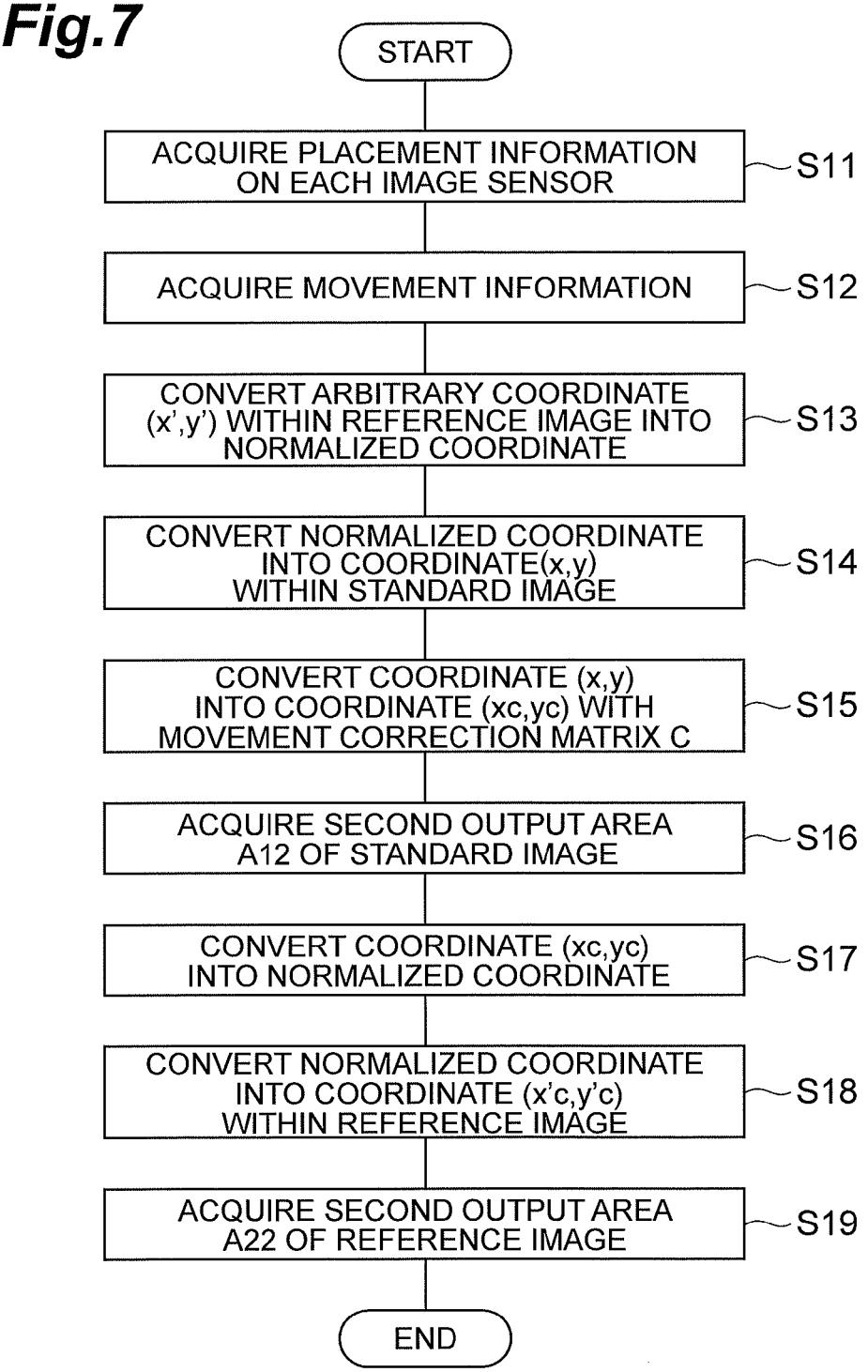
FIG. 7 is a flow chart showing acquisition processing of a second output area in the first embodiment.
Figure 10:
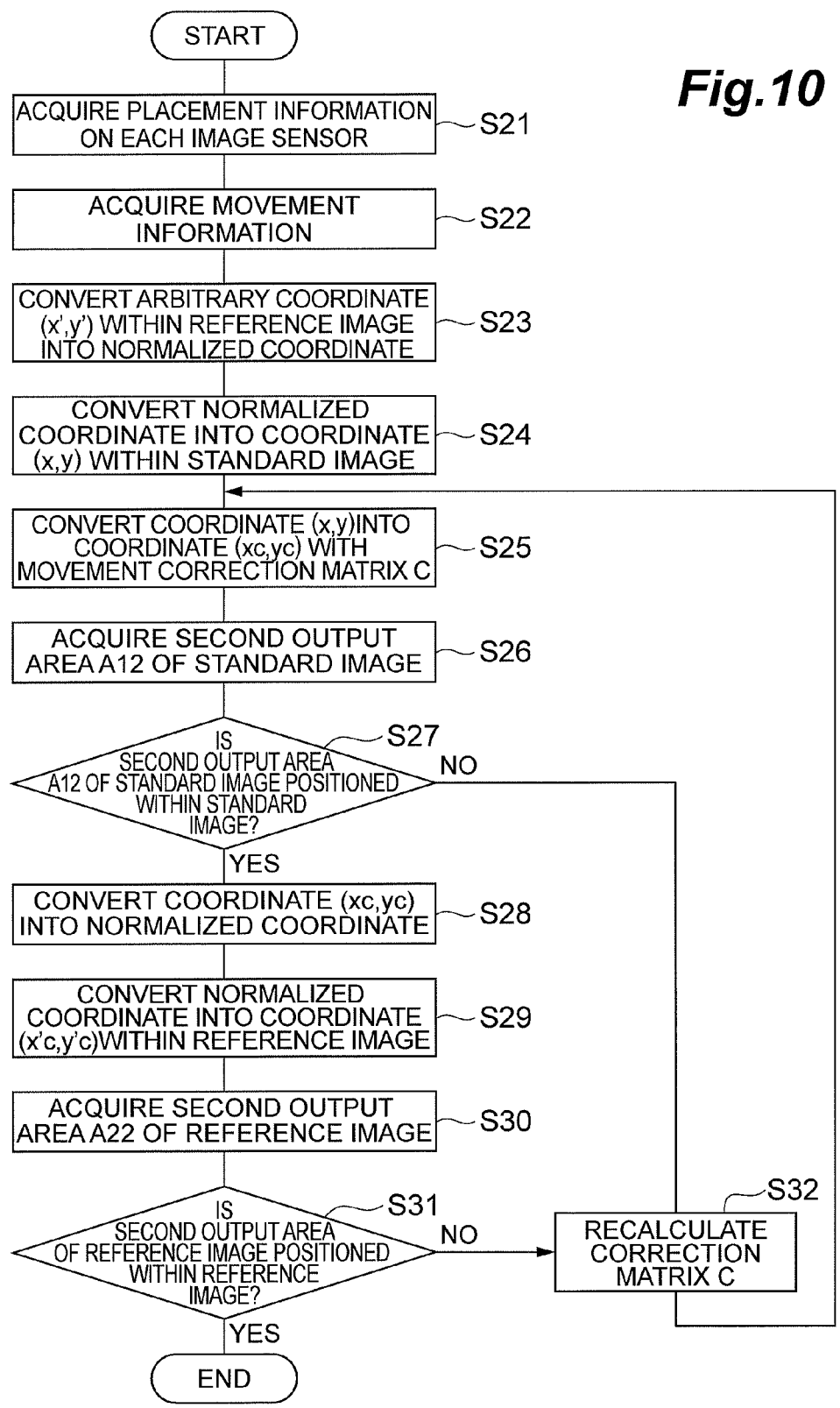
FIG. 10 is a flow chart showing acquisition processing of a second output area in the second embodiment.

Since steps S21 to S26 and steps S28 to S30 shown in FIG. 10 are identical to the operation in steps S11 to S19 shown in FIG. 7, respectively, descriptions thereof will be omitted. Once the second output area A12 of the base image is acquired in S26, the output area acquisition section 50A determines whether or not the second output area A12 of the base image is positioned within the base image (S27). When it is determined that the second output area A12 of the base image is positioned out of the base image, the output area acquisition section 50A recalculates the correction matrix C by Formula (10) (S32), and then processing shifts to step S25. When it is determined that the second output area A12 of the base image is positioned within the base image, then processing shifts to step S28.

Once the second output area A22 of the reference image is acquired in step S30, the output area acquisition section 50A determines whether or not the second output area A22 of the reference image is positioned within the reference image (S31). When it is determined that the second output area A22 of the reference image is positioned out of the reference image, the output area acquisition section 50A recalculates the correction matrix C by Formula (11) (S32), and then processing shifts to step S25. When it is determined that the second output area A22 of the reference image is positioned within the reference image, then the image processing shown in FIG. 10 is ended.

As described above, according to the present embodiment, the second output area A12 of the first image sensor 11 that is a base image sensor is acquired based on the position information of the first output area A11 determined by the placement information and based on the movement information, and the second output area A22 of the second image sensor 12, which is an image sensor different from the base image sensor, among the plurality of image sensors is acquired based on the placement information of the first image sensor 11, the placement information of the second image sensor 12, and the movement information. In this case, the second output area A12 of the first image sensor 11 and the second output area A22 of the second image sensor 12 are acquired based on the movement information which is common among the plurality of image sensors. Accordingly, correction processing can be performed with consistency among the images obtained from the plurality of image sensors.

The image processing apparatus 1A of the present embodiment also includes a determination section 60 which determines for all the image sensors whether or not position information of the second output areas A11 and A12 is positioned within the second frame image. When the position information of the second output areas A12 and A22 is not positioned within the second frame image, the output area acquisition section 50A sets moving amount, which is obtained by a difference between the position information of the first output area and the position information of the second output area, to be smaller until the position information of the second output area is positioned within the second frame image in all the image sensors. As a result, it becomes possible to prevent inability of image processing due to the second output areas A11 and A12 not positioned within the second frame image.

Third Embodiment

Next, a description will be given of an image processing apparatus according to a third embodiment. The image processing apparatus according to the present embodiment is different from that of the first embodiment in the point that movement information is acquired in the plurality of image sensors, and the movement information acquired in each imaging sensor is weight-averaged and is then used to obtain position information of the second output area.

Figure 11:
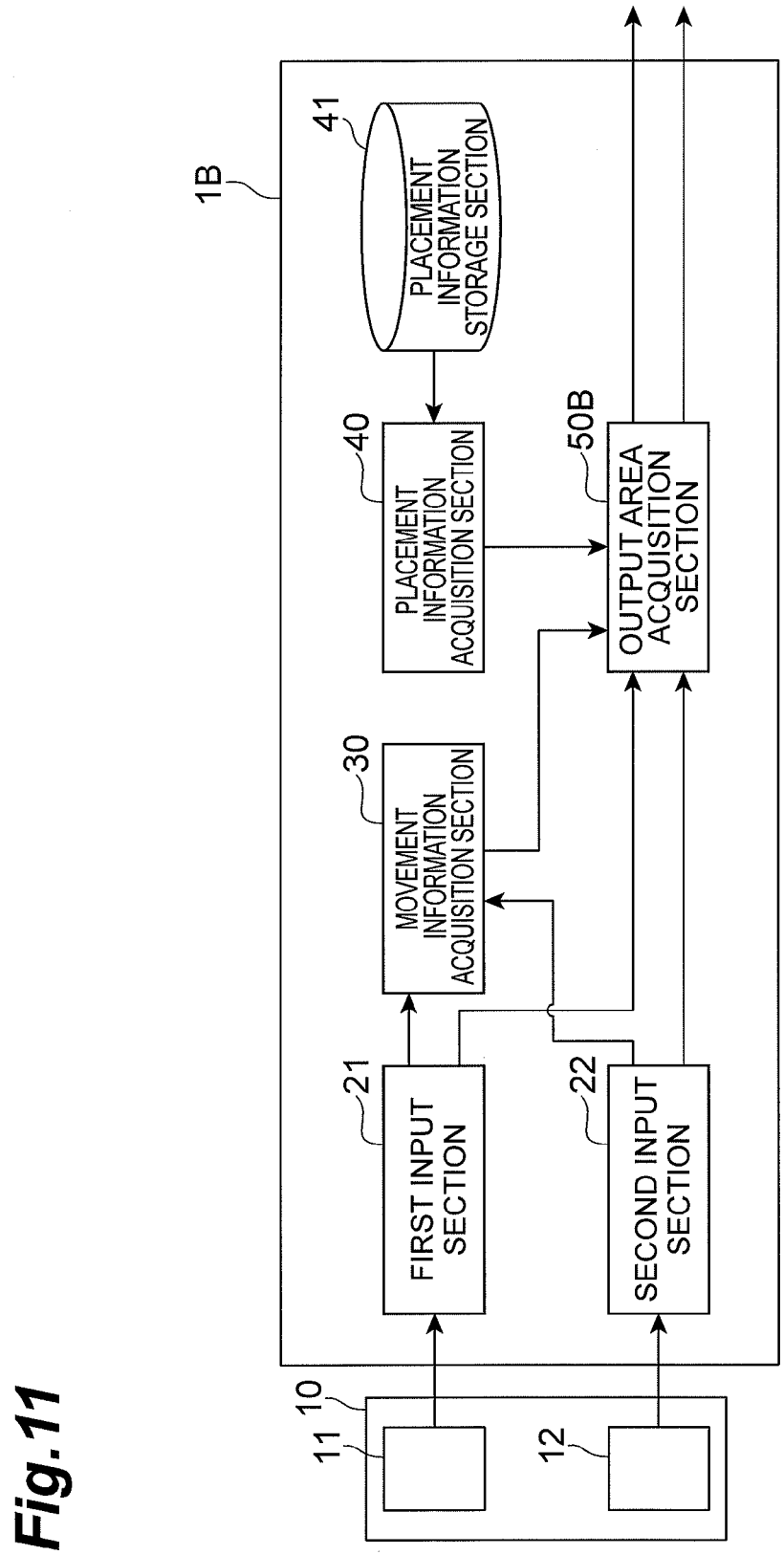
FIG. 11 is a block diagram showing a functional configuration of an image processing apparatus in a third embodiment.

FIG. 11 is a block diagram showing a functional configuration of an image processing apparatus 1B according to the present embodiment. The image processing apparatus 1B according to the present embodiment includes an output area acquisition section 50B in place of the output area acquisition section 50. In the image processing apparatus 1B according to the present embodiment, the second input section 22 outputs a reference image acquired from the second image sensor 12 to the movement information acquisition section 30. The movement information acquisition section 30 acquires movement information of the imaging section 10 between a first frame image and a second frame image of a base image acquired from the first input section 21 and movement information of the imaging section 10 between a first frame image and a second frame image of a reference image acquired from the second input section 22. The movement information acquisition section 30 of the present embodiment outputs the movement information obtained from the base image and the movement information obtained from the reference image to the output area acquisition section 50B.

The output area acquisition section 50B acquires, for each image sensor, position information of the second output area within the second frame image, which corresponds to the first output area within the first frame image. Hereinafter, a description will be given of calculation processing for acquiring position information of the second output area A12 of the first image sensor 11 and the second output area A22 of the second image sensor 12.

Figure 12:
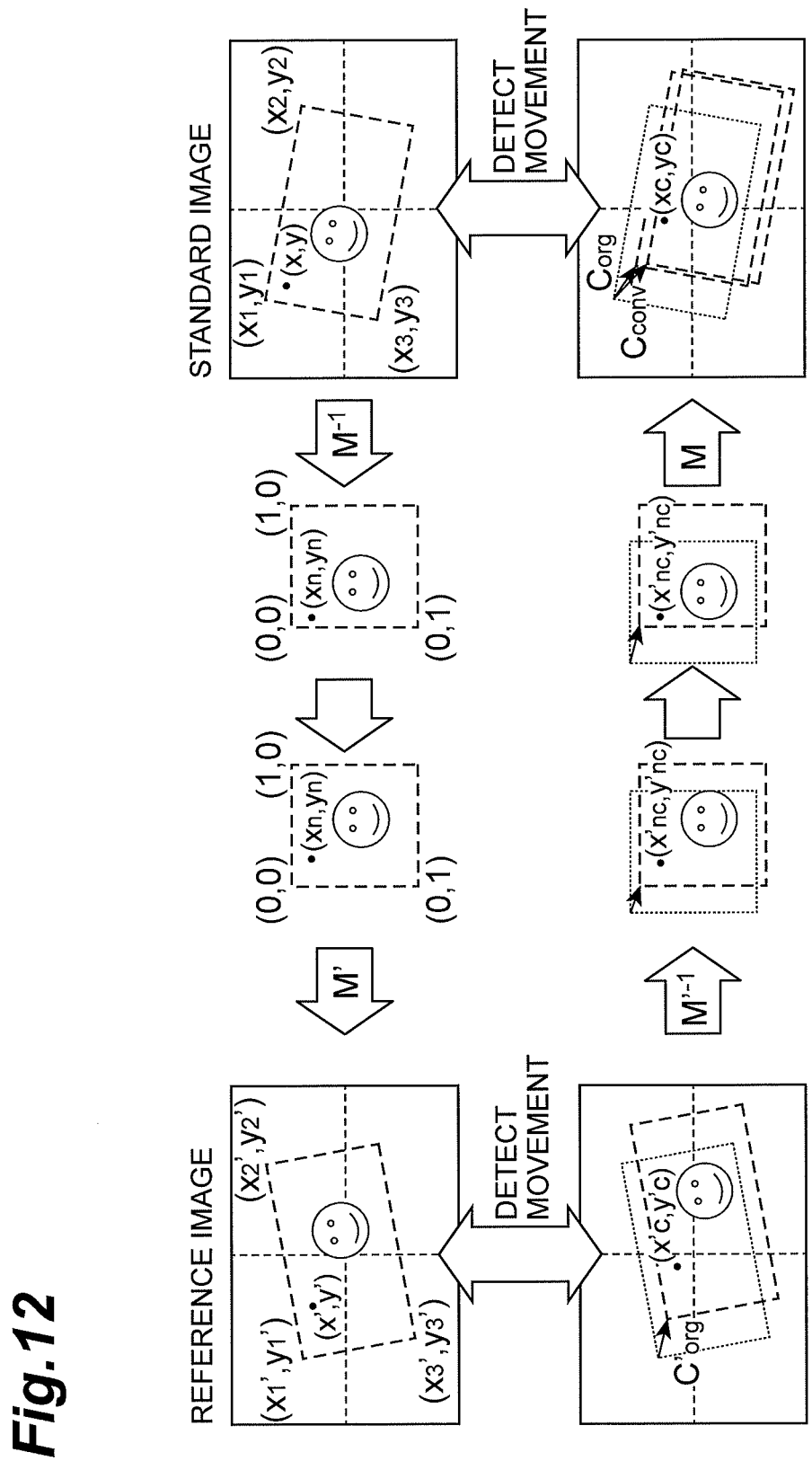
FIG. 12 is a view showing procedures for acquisition processing of an average movement correction matrix.

FIG. 12 shows procedures in calculation processing for acquiring the position information of the second output area A12 of the first image sensor 11 and the second output area A22 of the second image sensor 12. The calculation processing in the output area acquisition section 50B will be described along with FIG. 12.

First, the output area acquisition section 50B acquires movement information based on the base image outputted from the movement information acquisition section 30, and acquires a base movement correction matrix $C_{org}$ through processing similar to that in Formula (5).

Next, an arbitrary coordinate (x, y) within the base image is multiplied by a normalized-matrix $M^{-1}$ to convert the coordinate (x, y) into a coordinate (xn, yn) of the normal coordinate system. Next, the output area acquisition section 50B multiplies the coordinate (xn, yn) by the denormalized matrix M' to convert the coordinate (xn, yn) into a coordinate (x', y') of the coordinate system of the reference image.

The output area acquisition section 50B also acquires movement information based on the reference image outputted from the movement information acquisition section 30, and acquires a reference movement correction matrix $C'_{org}$ through processing similar to that in Formula (5). Next, as shown in Formula (6), the output area acquisition section 50B multiplies the coordinate (x', y') by the reference movement correction matrix $C'_{org}$ to obtain a corrected coordinate (x'c, y'c). Moving amount and a moving direction from the coordinate (x', y') to the coordinate (x'c, y'c) are equivalent to moving amount and a moving direction of the second output area A22 with respect to the first output area A21. Thus, the output area acquisition section 50B acquires the position information of the second output area A22.

Then, the output area acquisition section 50B multiplies the coordinate (x'c, y'c) by a normalized matrix $M'^{-1}$ to convert the coordinate (x'c, y'c) into a coordinate (x'nc, y'nc) of the normal coordinate system. Next, the output area acquisition section 50B multiplies the coordinate (x'nc, y'nc) by the denormalized matrix M to convert the coordinate (x'nc, y'nc) into a coordinate (xc, yc) of the coordinate system of the base image.

When the movement correction matrix for moving the first output area A11 of the base image to the second output area A12 is defined as a converted movement correction matrix $C'_{conv}$, the calculation processing performed by the output area acquisition section 50B up to this point can be expressed by Formula (12).

$$C'_{conv} = MM'^{-1}C'_{org}M'M^{-1} \quad (12)$$

At this point, the output area acquisition section 50B calculates a weighted average between the base movement correction matrix $C_{org}$ obtained from the base image and the converted movement correction matrix $C'_{conv}$, so as to obtain an average movement correction matrix $C_{avr}$ as shown in Formula (13). In Formula (13), $w_{org}$ and $w_{conv}$ represent weights against the first image sensor 11 and the second image sensor 12, respectively. These weights are values set according to the reliability of the first image sensor 11 and the second image sensor 12. For example, when the first image sensor 11 is an infrared camera and the second image sensor 12 is a general visible light camera in the case of photo shooting at night time, the weight of the first image sensor 11 which is superior in photo shooting in the dark may be set heavier.

$$C = \frac{w_{org}C_{org} + w_{conv}C'_{conv}}{w_{org} + w_{conv}} \quad (13)$$

Then, the output area acquisition section 50B performs calculation of Formulas (1) to (4) and (6) to (9) shown in the first embodiment with use of the average movement correction matrix $C_{avr}$ obtained by Formula (13). As a result, position information of the second output area A12 of the base image and the second output area A22 of the reference image is acquired. The output area acquisition section 50B may also perform calculation of Formulas (10) and (11) shown in the second embodiment so as to prevent the second output areas A12 and A22 from being set outside the second frame image of the base image and the reference image.

Next, a description will be given of operation of the image processing apparatus 1B and a method for image processing according to the present embodiment with reference to FIGS. 13 and 14.

Figure 13:
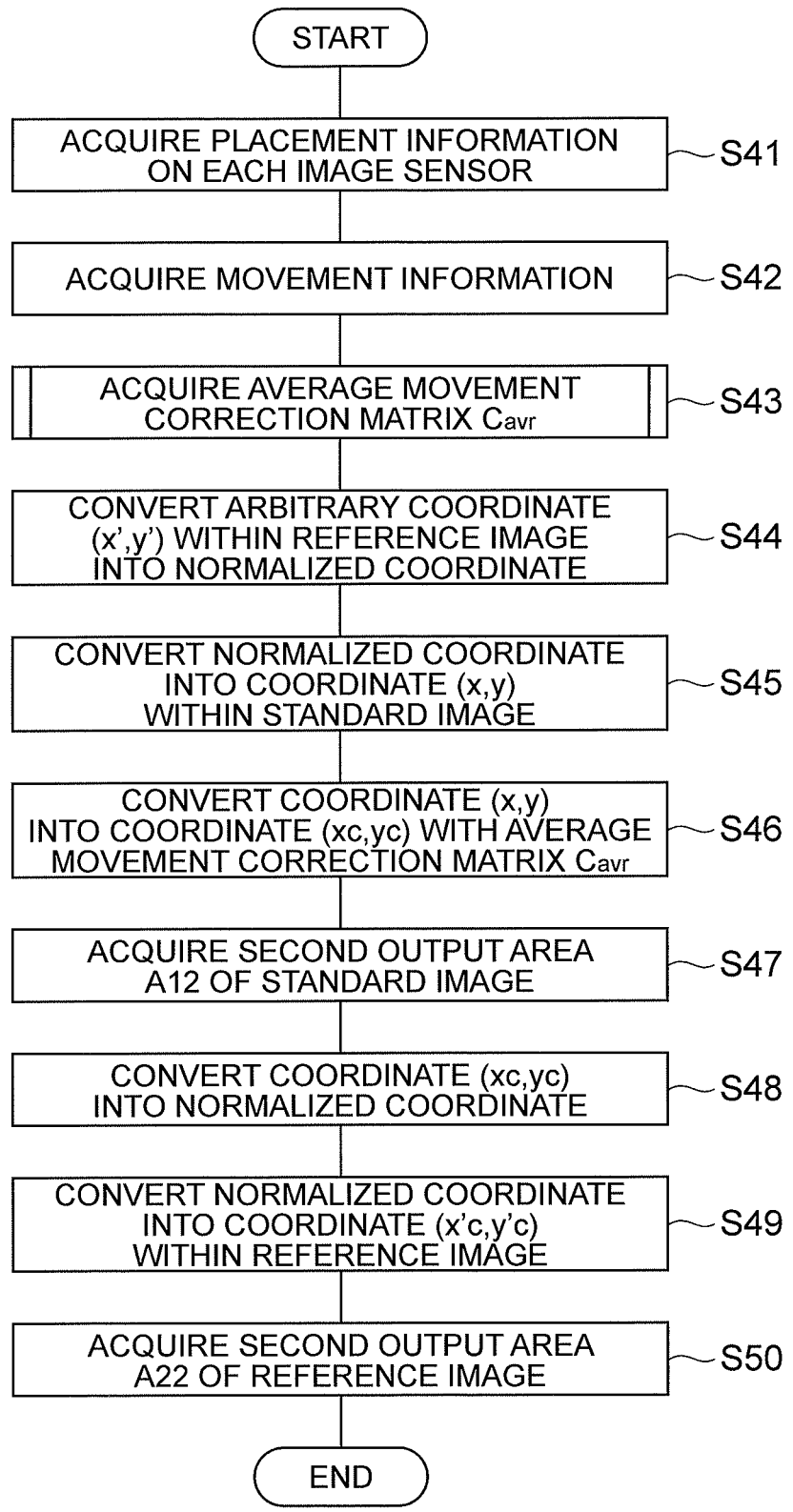
FIG. 13 is a flow chart showing acquisition processing of a second output area in the third embodiment.
Figure 14:
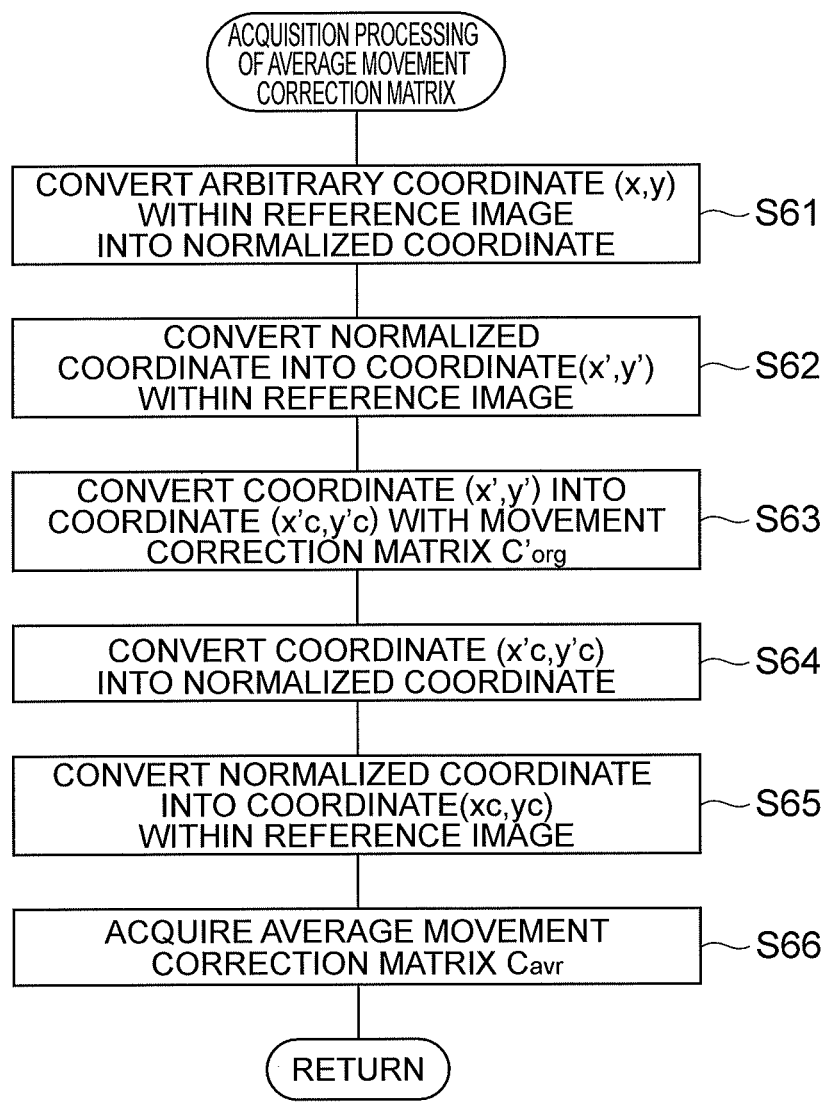
FIG. 14 is a flow chart showing acquisition processing of an average movement correction matrix.

Since steps S41, S42, S44, S45, S47 to S50 shown in FIG. 13 are identical to the operation in steps S11 to S14 and steps S16 to S19 shown in FIG. 7 respectively, the description thereof will be omitted. Once the movement information is acquired in S26, the output area acquisition section 50B performs acquisition processing of an average movement correction matrix $C_{avr}$ (S43). The procedures for acquisition processing of the average movement correction matrix $C_{avr}$ is shown in FIG. 14.

In the acquisition processing of the average movement correction matrix $C_{avr}$, the output area acquisition section 50B converts an arbitrary coordinate (x, y) within the base image into a normal coordinate (S61). Next, the output area acquisition section 50 converts the normal coordinate into a coordinate (x', y') within the reference image (S62). In this case, a denormalized matrix M' for use in conversion to the coordinate (x, y) within the base image is a value determined by placement information of the second image sensor 12.

Next, the output area acquisition section 50B converts the coordinate (x', y') into a coordinate (x'c, y'c) with a movement correction matrix $C'_{conv}$ determined by the movement information which was acquired by the movement information acquisition section 30 (S63). Next, the output area acquisition section 50B converts the coordinate (x'c, y'c) into a normal coordinate (S64). Then, the output area acquisition section 50B converts the normal coordinate into a coordinate (xc, yc) within the base image (S65). As shown in Formula (12), a converted movement correction matrix $C_{conv}$ is obtained by a series of processing from steps S61 to S65. Next, the output area acquisition section 50B acquires the average movement correction matrix $C_{avr}$ by Formula (13) (S66).

Then, the processing returns to the procedures of FIG. 13. In step S46, the output area acquisition section 50B converts the coordinate (x, y) into the coordinate (xc, yc) with the average movement correction matrix $C_{avr}$ (S46).

As described above, also in the present embodiment, the second output area A12 of the first image sensor 11 that is a base image sensor is acquired based on the position information of the first output area A11 determined by the placement information and based on the movement information, and the second output area A22 of the second image sensor 12, which is an image sensor different from the base image sensor, among the plurality of image sensors is acquired based on the placement information of the first image sensor 11, the placement information of the second image sensor 12, and the movement information. In this case, the second output area A12 of the first image sensor 11 and the second output area A22 of the second image sensor 12 are acquired based on the movement information which is common among the plurality of image sensors. Accordingly, correction processing can be performed with consistency among the images obtained from the plurality of image sensors.

The image processing apparatus 1B of the present embodiment also acquires an average movement correction matrix $C_{avr}$ from a weighted average of the movement information obtained from the first image sensor 11 and the movement information obtained from the second image sensor 12. In this case, since the movement information shown by the average movement correction matrix $C_{avr}$ is the information in consideration of the movement information acquired by the plurality of base image sensors, accurate movement information can be obtained.

(Modification)

In the embodiments disclosed above, the output area acquisition section uses an area other than the output area which is needed because of using the plurality of image sensors as an area for performing hand shake correction. Here, the area other than the output area may be used for an image processing operation different from the hand shake correction. For example, the area other than the output area which is needed because of using the plurality of image sensors may be used as an area for use in correcting distortion generated by movement of the imaging section 10 and the object T. When the placement positions of imaging sensors are displaced, a distortion correction coefficient may be calculated in each of image sensors based on, for example, a motion vector in the base image, since the distortion correction coefficient is different in each of the image sensors.

Although the present invention has been described in detail based on the embodiments thereof, the present invention is not limited to the embodiments disclosed. Various deformations are possible in the present invention without departing from the scope thereof.

For example, in the above embodiments, the movement information is acquired from the first frame image and the second frame image generated in the first image sensor 11 and the second image sensor 12. However, the movement information may be acquired by an external hardware such as a gyro sensor.

In the above embodiments, the first image sensor 11 is used as a base image sensor and the second image sensor 12 is used as a reference image sensor. However, selection of an image sensor to be used as the base image sensor may be made based on image pickup conditions. For example, when the first image sensor 11 is an infrared camera and the second image sensor 12 is a general visible light camera, a sensor selection section may be provided so as to select the first image sensor 11 as a base image sensor for photo shooting at night time or to select the second image sensor 12 as a base image sensor for photo shooting in the light. In this way, images of each of image sensors can be corrected with use of the information of an image sensor which is suitable for hand shake correction among the image sensors having different properties.

What is claimed is:

1. An image processing apparatus which performs image processing of a plurality of frame images generated by an imaging device having a plurality of image sensors each continuously generating a first frame image and a second frame image in sequence, comprising:

a placement information acquisition section which acquires, for each image sensor, placement information indicating placement conditions of the image sensors with respect to the imaging device;

a movement information acquisition section which acquires movement information of the imaging device between the first frame image and the second frame image; and an output area acquisition section which acquires, for each image sensor, position information of a second output area within the second frame image, the second output area corresponding to a first output area within the first frame image, wherein the output area acquisition section acquires:

as a reference base, the second output area of a first image sensor from among the plurality of image sensors based on the position information of the first output area determined by the placement information and based on the movement information; and the second output area of a second image sensor being different from the first image sensor, from among the plurality of image sensors based on the placement information of the first image sensor, the placement information of the second image sensor, and the movement information.

2. The image processing apparatus according to claim 1, comprising:
   a determination section which determines for all the image sensors whether the position information of the second output area is positioned within the second frame image, wherein
   when the position information of the second output area is not positioned within the second frame image, the output area acquisition section sets moving amount obtained by a difference between the position information of the first output area and the position information of the second output area to be smaller until the position information of the second output area is positioned within the second frame image in all the image sensors.

3. The image processing apparatus according to claim 2, wherein
   the movement information acquisition section acquires the movement information from the first frame image and the second frame image generated in the first image sensor.

4. The image processing apparatus according to claim 2, wherein
   the movement information acquisition section acquires the movement information by a gyro sensor.

5. The image processing apparatus according to claim 2, wherein
   the movement information acquisition section acquires as the movement information a weighted average of the movement information acquired from the first frame image and the second frame image generated by the plurality of image sensors.

6. The image processing apparatus according to claim 2, wherein
   the first image sensor is selected out of the plurality of image sensors based on image pickup conditions.

7. The image processing apparatus according to claim 2, wherein
   the output area acquisition section uses an area other than the output area which is needed for provision of the plurality of image sensors as an area for use in correction with movement.

8. The image processing apparatus according to claim 1, wherein
   the movement information acquisition section acquires the movement information from the first frame image and the second frame image generated in the first image sensor.

9. The image processing apparatus according to claim 8, wherein
   the first image sensor is selected out of the plurality of image sensors based on image pickup conditions.

10. The image processing apparatus according claim 8, wherein
    the output area acquisition section uses an area other than the output area which is needed for provision of the plurality of image sensors as an area for use in correction with movement.

11. The image processing apparatus according to claim 1, wherein
    the movement information acquisition section acquires the movement information by a gyro sensor.

12. The image processing apparatus according to claim 11, wherein the first image sensor is selected out of the plurality of image sensors based on image pickup condition.

13. The image processing apparatus according to claim 11, wherein
    the output area acquisition section uses an area other than the output area which is needed for provision of the plurality of image sensors as an area for use in correction with movement.

14. The image processing apparatus according to claim 1, wherein
    the movement information acquisition section acquires as the movement information a weighted average of the movement information acquired from the first frame image and the second frame image generated by the plurality of image sensors.

15. The image processing apparatus according to claim 14, wherein
    the first image sensor is selected out of the plurality of image sensors based on image pickup condition.

16. The image processing apparatus according claim 14, wherein
    the output area acquisition section uses an area other than the output area which is needed for provision of the plurality of image sensors as an area for use in correction with movement.

17. The image processing apparatus according to claim 1, wherein
    the first image sensor is selected out of the plurality of image sensors based on image pickup conditions.

18. The image processing apparatus according to claim 1, wherein
    the output area acquisition section uses an area other than the output area being needed because of using the plurality of image sensors, as an area for use in correction with movement.

19. An image processing method for performing image processing of a plurality of frame images generated by an imaging device having a plurality of image sensors which continuously generate a first frame image and a second frame image in sequence, comprising:
    a placement information acquisition step of acquiring, for every image sensor, placement information indicating placement conditions of the image sensors with respect to the imaging device;
    a movement information acquisition step of acquiring movement information of the imaging device between the first frame image and the second frame image; and
    an output area acquisition step of acquiring, for every image sensor, position information of a second output area within the second frame image which corresponds to a first output area within the first frame image, wherein
    in the output area acquisition step,
    as a reference base, the second output area of a first image sensor from among the plurality of image sensors is acquired based on position information of the first output area determined by the placement information and based on the movement information, and
    the second output area of a second image sensor being different from the first image sensor, from among the plurality of image sensors is acquired based on placement information of the first image sensor, placement information of the second image sensor, and the movement information.

20. A non-transitory storage medium having stored thereon an image processing program for operating a computer to perform image processing of a plurality of frame images generated by an imaging device having a plurality of image sensors which continuously generate a first frame image and a second frame image in sequence, the program causing the computer to function as:

- a placement information acquisition section which acquires, for every image sensor, placement information indicating placement conditions of the image sensors with respect to the imaging device;
- a movement information acquisition section which acquires movement information of the imaging device between the first frame image and the second frame image; and
- an output area acquisition section which acquires, for every image sensor, position information of a second output area within the second frame image which corresponds to a first output area within the first frame image, wherein the output area acquisition section acquires:

as a reference base, the second output area of a first image sensor from among the plurality of image sensors based on position information of the first output area determined by the placement information and based on the movement information; and the second output area of a second image sensor being different from the first image sensor, from among the plurality of image sensors based on placement information of the first image sensor, placement information of the second image sensor, and the movement information.

* * * * *